(12) United States Patent
Hashimoto et al.

(10) Patent No.: US 6,717,766 B2
(45) Date of Patent: Apr. 6, 2004

(54) AUTOMATIC CHANGER FOR CARTRIDGE-TYPE RECORDING MEDIUM

(75) Inventors: Koujirou Hashimoto, Kawasaki (JP); Kenichi Utsumi, Kawasaki (JP); Yuji Kato, Inagi (JP); Kazuhiko Kawase, Inagi (JP); Satoshi Kanbayashi, Inagi (JP); Yasushi Goto, Inagi (JP)

(73) Assignee: Fujistu Limited, Kawasaki (JP)

( * ) Notice: Subject to any disclaimer, the term of this patent is extended or adjusted under 35 U.S.C. 154(b) by 0 days.

(21) Appl. No.: 10/141,883

(22) Filed: May 10, 2002

(65) Prior Publication Data

US 2003/0030938 A1 Feb. 13, 2003

(30) Foreign Application Priority Data

Aug. 13, 2001 (JP) ........................................ 2001-245690

(51) Int. Cl.⁷ ............................ G11B 15/68; B65G 11/00
(52) U.S. Cl. .......................................... 360/92; 414/751
(58) Field of Search ............................ 360/92; 414/751, 414/732, 736

(56) References Cited

U.S. PATENT DOCUMENTS 5,303,034 A * 4/1994 Carmichael et al. ........ 356/620

FOREIGN PATENT DOCUMENTS

| EP | 537923 | * | 4/1993 |
| JP | 59-213061 | | 12/1984 |
| JP | 63-200357 | | 8/1988 |
| JP | 5-144147 | | 6/1993 |
| JP | 5-325354 | | 12/1993 |

* cited by examiner

Primary Examiner—George J. Letscher
(74) Attorney, Agent, or Firm—Westerman, Hattori, Daniels & Adrian, LLP

(57) ABSTRACT

Provides an automatic changer with excellent space efficiency, by reducing the size of a hand mechanism section that is mounted with a CCD. The automatic changer selects and holds one desired cartridge from among one of accommodation cells provided in a magazine, conveys this selected cartridge to a recording/reproducing apparatus, and reads a bar code label adhered to the side surface of the cartridge thereby to identify the cartridge. The automatic changer has the CCD that reads a bar code disposed in the inner part of a casing that movably accommodates a hand mechanism section for holding the cartridge. The automatic changer also has a condenser lens for focusing the image of the bar code on the CCD disposed at one part of the hand mechanism section. With this arrangement, the automatic changer moves the hand mechanism section to the front of the cartridge accommodated in the accommodation cell, and focuses the image of the bar code on the CCD. Then, the CCD identifies the contents of the cartridge.

11 Claims, 9 Drawing Sheets

AUTOMATIC CHANGER FOR CARTRIDGE-TYPE RECORDING MEDIUM

BACKGROUND OF THE INVENTION

1. Field of the Invention

The present invention relates to an automatic changer and, more particularly, to an automatic changer that selects one cartridge-type recording medium from among a large number of such recording media accommodated in a recording/reproducing apparatus, and moves this selected recording medium to a desired position.

2. Description of the Related Art

Conventionally, there has been practically used an automatic changer for cartridge-type recording media which is structured to accommodate a plurality of double-reel type audio or video cassette tapes or single-reel type data recording cartridge tapes on shelves within one accommodation box. The automatic changer selects one desired tape from among these tapes, and conveys this tape to a reproducing or recording apparatus.

This automatic changer is used being connected to a computer system such as a server, personal computer, and so on. In this automatic changer, a plurality of cartridges are accommodated on shelves, and a hand mechanism section is provided on an accessor that is movably structured to hold and convey a cartridge. A bar code label is adhered to a surface of each cartridge at the hand mechanism section side.

On the other hand, a bar code reader is provided on a base section of the hand mechanism section adjacent to the hand mechanism section. This bar-code reader reads the bar code label adhered to each cartridge, and identifies this cartridge. The conventional library device uses a laser bar-code reader. This bar-code reader irradiates laser beams onto the cartridge over a predetermined range of this cartridge, and reads the bar code.

Japanese Patent Application Laid-open Publication No. 5-144147 discloses an automatic changer that is an improved conveyor of an automatic cassette changer for a television broadcasting station that is used to reproduce or edit the recording of a series of videos over many hours while changing a plurality of video cassettes. According to this automatic changer, a bar-code reader provided on the hand mechanism section of this automatic changer can directly and continuously read bar codes provided on the side surfaces of cassettes, in order to specify a plurality of cassettes accommodated on a plurality of shelves.

Further, according to the automatic changer disclosed in Japanese Patent Application Laid-open Publication No. 5-144147, a hand block selectively holds one of the plurality of cassettes accommodated on the plurality of accommodation shelves, and conveys this selected cassette to a recording/reproducing apparatus. A label printed with a bar code is adhered to the hand-block side end surface of each cassette accommodated on each accommodation shelf.

The hand block is fitted to the conveyor via an arm, to move freely between the accommodation shelf and the recording/reproducing apparatus to convey one cassette. For this purpose, four cassette-holding pins are provided on the hand block to hold one cassette. On the side surface of the hand block, a bar-code reader is adhered to scan and read bar codes of the plurality of cassettes.

Further, according to the automatic changer disclosed in Japanese Patent Application Laid-open Publication No. 5-144147, the hand block moves the bar-code reader along the bar codes of the plurality of cassettes that are accommodated on the plurality of accommodation shelves. The bar-code reader sequentially and continuously reads these bar codes, and identifies each cassette.

However, in recent years, an apparatus that utilizes a CCD (charged-coupled device) has come to be practically used as an image pick-up member, instead of using laser beams to read bar codes. According to this apparatus that utilizes the CCD, the CCD reads an image of a bar code, analyzes this image, and reads the contents of the bar code. In order for the CCD to read the bar code, it is necessary to provide a condenser lens that focuses the image of the bar code on the CCD.

However, as the bar-code reader of the library device is a large laser type, and is mounted adjacent to the hand mechanism section, the movable range of the hand mechanism section becomes small. Therefore, the space in which the cartridges are accommodated has become narrow. Further, there is a range of distance over which the bar-code reader can read bar codes. Therefore, there has been a risk that the bar-code reader cannot read bar codes when the distance between the bar-code reader and the bar code labels changes.

Further, according to the automatic changer disclosed in Japanese Patent Application Laid-open Publication No. 5-144147, the bar-code reader is mounted on the side surface of the hand mechanism section. Therefore, there has been a problem that the hand mechanism section is large, and a wasteful space is generated in the apparatus. When a reflection-type sensor or a laser-type sensor is mounted on the bar-code reader, there is margin in the reading distance from the bar-code reader to the bar code labels. However, these types of sensors are very expensive, and the mounting of these devices leads to a high cost of the bar-code reader.

On the other hand, when a CCD is used to read the bar codes, it is possible to minimize the cost of the bar-code reader, as the CCD is at a very low cost (ten percent of the cost of the laser type). However, this has had a problem that there is no margin in the reading distance. In order to solve this problem, a condenser lens is fitted to a holding mechanism of the hand mechanism section that moves forward and backward. By controlling the lens position (that is, by automatically focusing the image of the bar code), the distance margin for the reading is increased. However, as the CCD and the condenser lens are also mounted in this case, a large space is necessary for their accommodation. Therefore, the hand mechanism section is large, and this limits the moving area of the hand mechanism section. Consequently, there has been a problem that only a small number of cartridges can be accommodated in the automatic changer.

SUMMARY OF THE INVENTION

It is, therefore, an object of the present invention to provide an automatic changer in which it is possible to accommodate a large number of cartridges, with excellent space efficiency, without increasing the size of a hand mechanism section, even when a CCD that requires the mounting of a condenser lens is mounted on the hand mechanism section in order to read identifiers printed on labels adhered to cartridges that accommodate recording media.

In order to achieve the above object, according to one aspect of the present invention, there is provided an automatic changer comprising a cartridge accommodating section that accommodates a plurality of cartridges such that these cartridges can be selected, and an accessor that selects one cartridge from the accommodating section, and conveys the selected cartridge to a predetermined position within a casing, the automatic changer being structured to read an identifier of a label adhered to at least one surface of a cartridge, and identifies each cartridge, wherein a hand mechanism that holds a cartridge and pulls the cartridge into the internal space or releases the cartridge from the internal space, is provided within an internal space that accommodates the cartridges; an identifier-image pick-up member is disposed in the inner part of the internal space; a condenser lens is disposed on an optical axis of the image pick-up member in a move direction of the hand mechanism; and the hand mechanism in a status of not holding the cartridge is moved within the internal space thereby to focus the identifier on the image pick-up member.

Further, according to another aspect of the invention, the image pick-up member may be a CCD. Further, a cartridge may be a magnetic-tape cartridge, a cartridge that accommodates an optical magnetic disk, or a cartridge that accommodates a non-volatile IC memory.

Further, according to still another aspect of the invention, in general, it is possible to use a bar code for the identifier. It is also possible to use a mark other than a bar code for the identifier.

Further, according to still another aspect of the invention, there is provided an automatic changer in which the accessor is structured to be able to move along a guide rail provided on a floor surface of the casing in a width direction; cartridge accommodating sections are provided at both sides of the accessor along a moving direction of the accessor; and a rotation mechanism is provided that can convey a cartridge to any one of the cartridge accommodating sections based on a rotation of the accessor in a horizontal direction.

Further, according to still another aspect of the invention, there is provided the automatic changer of the above aspect wherein a driver, as a recording/reproducing apparatus to which the accessor conveys a cartridge, is provided at one side of the accessor in its moving direction. Further, according to still another aspect of the invention, there is provided the automatic changer of the above aspect wherein the cartridge accommodating section at one side at which the driver is provided is fixed, and the other cartridge accommodating section at the other side is formed as a magazine that can be exchanged. Further, according to still another aspect of the invention, there is provided the automatic changer of the above aspect wherein the magazine that can be exchanged is detachably fitted to an open/close window of the automatic changer. Further, according to still another aspect of the invention, there is provided the automatic changer of the above aspect wherein a ball screw applied in a width direction of the casing is engaged with the other end of the guide rail of the accessor, and the accessor moves based on a rotation of the ball screw.

According to the automatic changer of the present invention, the image pick-up member that reads an identifier attached to a cartridge and recognizes this cartridge and the condenser lens are provided within the casing and the hand mechanism of the accessor respectively. Therefore, the image pick-up member and the condenser lens do not stretch out from the accessor, and it becomes possible to make the accessor compact. As a result, it is possible to reduce the sizes of the automatic changer and increase the number of cartridges accommodated within the automatic changer, without changing the sizes of the automatic changer.

BRIEF DESCRIPTION OF THE DRAWINGS

The present invention will be more clearly understood from the description as set forth below with reference to the accompanying drawings, wherein.

DETAILED DESCRIPTION OF THE PREFERRED EMBODIMENTS

Before describing the preferred embodiments, an explanation will be given of a conventional automatic changer for a cartridge-type recording medium shown in FIGS. 1 to 2B.

Figure 1:
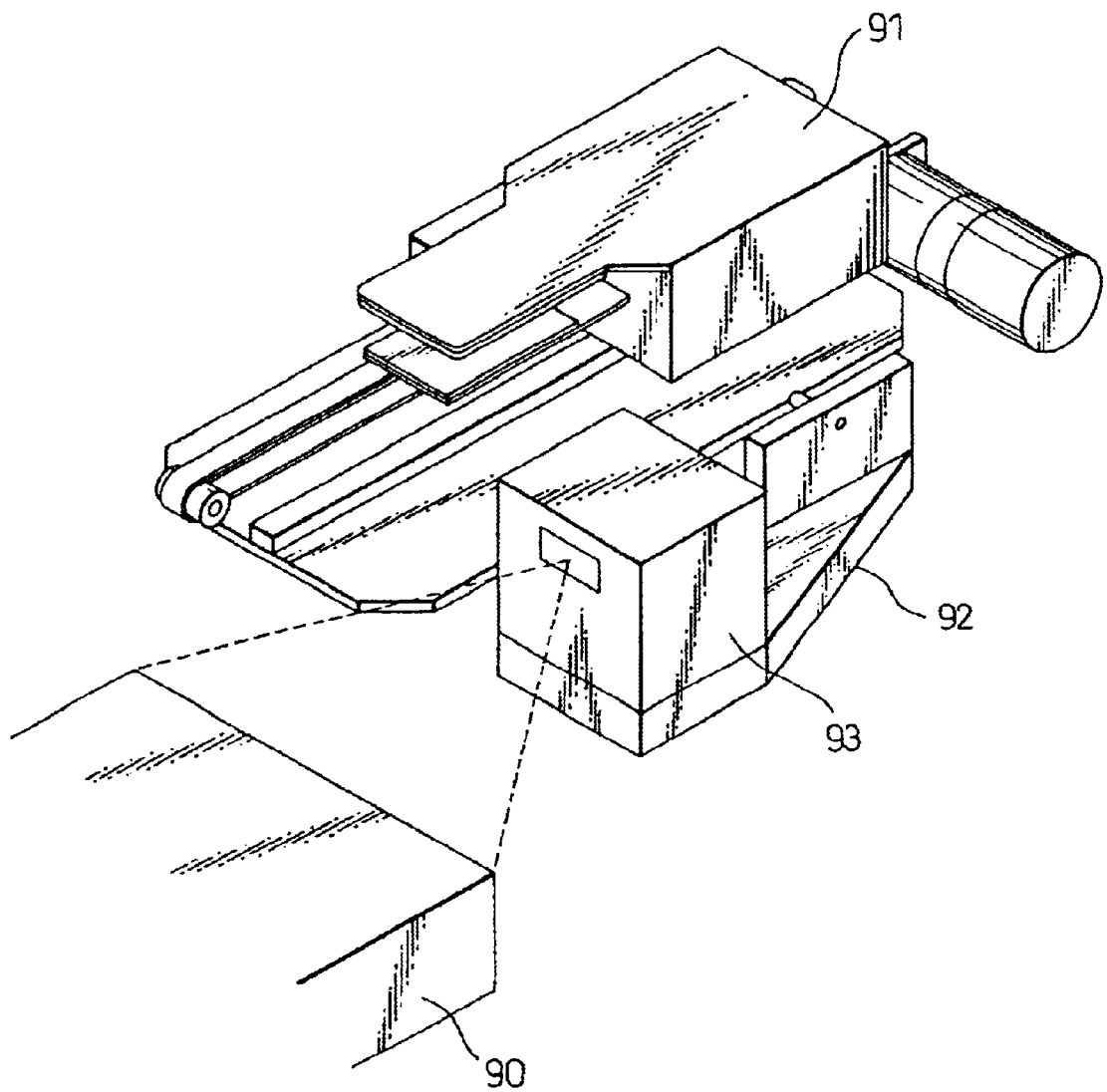
FIG. 1 is a perspective view of a part of a structure of an automatic changer in a conventional library device.

FIG. 1 shows a part of an automatic magnetic-tape cartridge changer in a magnetic-tape library device as a large-capacity storage that is connected to a large computer system. This automatic changer has a hand mechanism section 91 provided on an accessor that is movably structured to hold and convey a cartridge 90 as a recording medium. A plurality of cartridges 90 are accommodated on shelves provided within the library device, and a bar code label is adhered to a surface of each cartridge at the hand mechanism section side. On the other hand, a bar code reader 93 is provided on a base section 92 of the hand mechanism section 91, adjacent to the hand mechanism section 91. This bar-code reader 93 reads the bar code label adhered to the cartridge 90, and identifies this cartridge 90. The conventional library device uses a laser-type bar-code reader for the bar-code reader 93. This bar-code reader 93 irradiates laser beams onto the cartridge 90 over a range shown by broken lines, and reads the bar code.

The automatic changer disclosed in Japanese Patent Application Laid-open Publication No. 5-144147 is an improved conveyor of an automatic cassette changer for a television broadcasting station that is used to reproduce or edit the recording of series of videos over many hours while changing a plurality of video cassettes. According to this automatic changer, a bar-code reader provided on the hand mechanism section of this automatic changer can directly and continuously read bar codes provided on the side surfaces of cassettes, in order to specify a plurality of cassettes accommodated on a plurality of shelves.

Figure 2A:
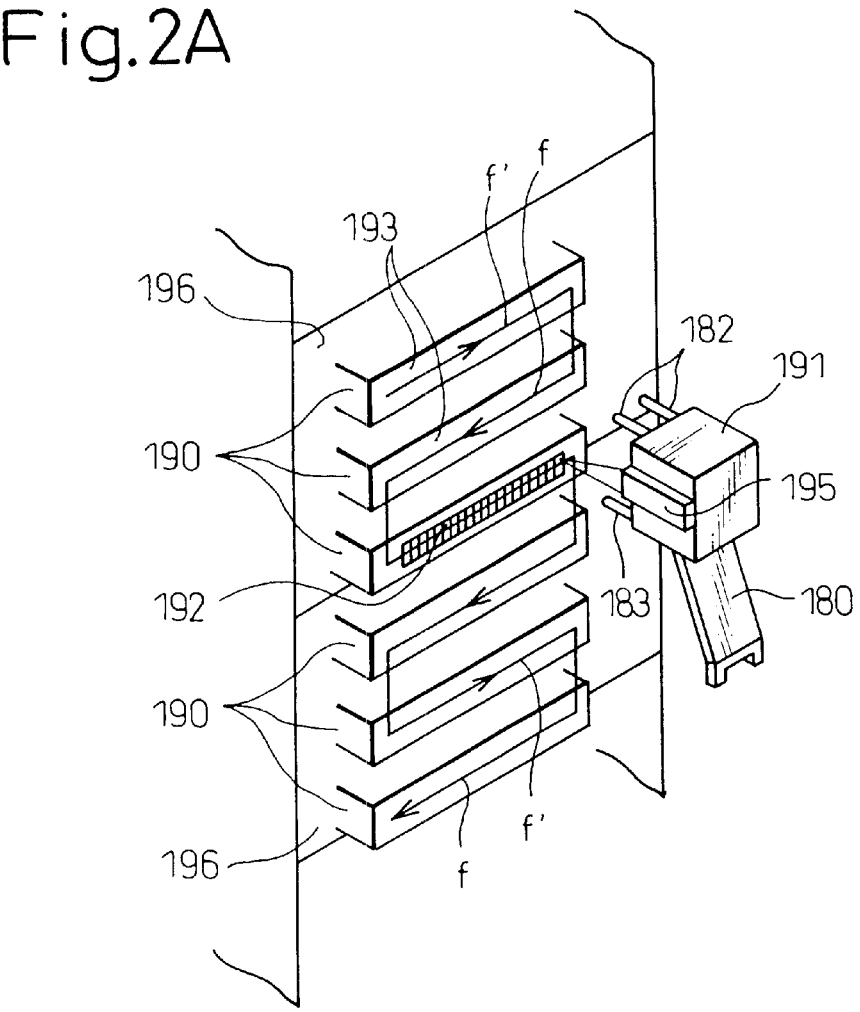
FIG. 2A is a perspective view showing a structure of an automatic changer described in a conventional publication.
Figure 2B:
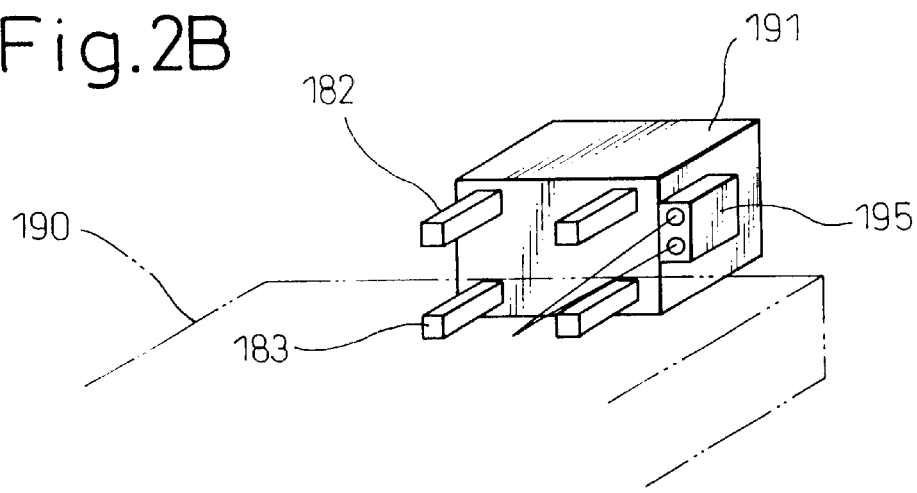
FIG. 2B is a perspective view of a hand block shown in FIG. 2A as viewed from a cassette side.

FIGS. 2A and 2B show structures of the automatic changer disclosed in Japanese Patent Application Laid-open Publication No. 5-144147. According to the automatic changer disclosed in this publication, a hand block 191 selectively holds one of the plurality of cassettes 190 accommodated on a plurality of accommodation shelves 196, and conveys this selected cassette to a recording/reproducing apparatus not shown. A label printed with a bar code 192 is adhered to an end surface 193, at the side of the hand block 191, of each cassette 190 accommodated on each accommodation shelf 196.

The hand block 191 is fitted to the conveyor, not shown, via an arm 180, to move freely between the accommodation shelf 196 and the recording/reproducing apparatus, not shown, to convey one cassette 190. For this purpose, four cassette-holding pins 182 and 183 are provided on the hand block 191 to hold one cassette. On the side surface of the hand block 191, a bar-code reader 195 is adhered to scan and read bar codes 192 of the plurality of cassettes 190 in a direction as shown by arrows f' and f.

Further, according to the automatic changer disclosed in Japanese Patent Application Laid-open Publication No. 5-144147, the hand block 191 moves the bar-code reader 195 in the direction of the arrows f' and f along the bar codes 192 of the plurality of cassettes 190 that are accommodated on the plurality of accommodation shelves 196. The bar-code reader 195 sequentially reads these bar codes 192 continuously, and identifies each cassette 190.

However, in recent years, an apparatus that utilizes a CCD (charged-coupled device) has come to be practically used as an image pick-up member, instead of using laser beams to read bar codes. According to this apparatus that utilizes the CCD, the CCD reads an image of a bar code, analyzes this image, and reads the contents of the bar code. In order to enable the CCD to read a bar code, it is necessary to provide a condenser lens that focuses the image of the bar code on the CCD.

Embodiments of the present invention will be explained in detail below with reference to the attached drawings.

Figure 3A:
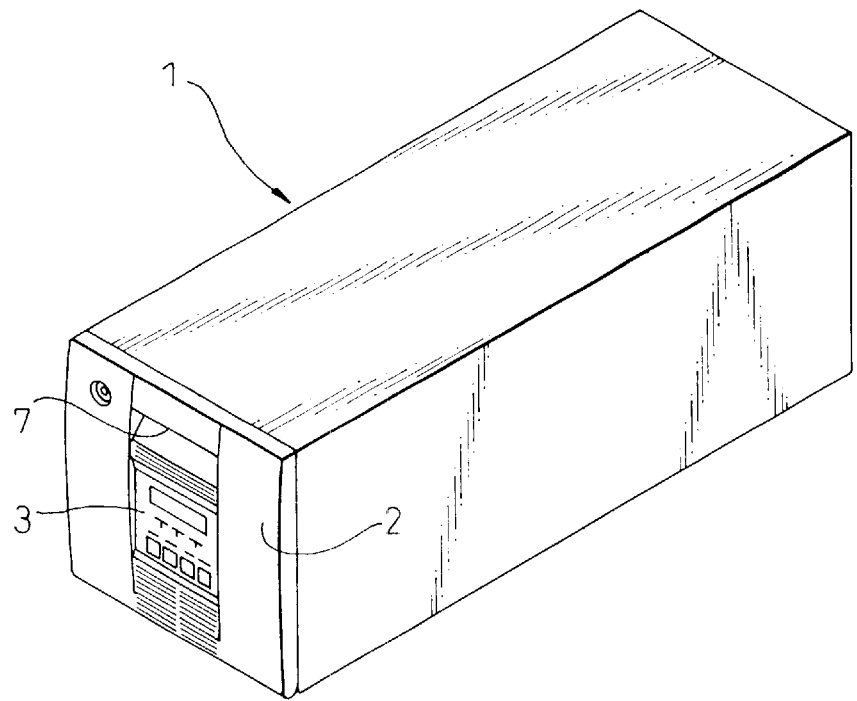
FIG. 3A is a perspective view of an automatic magnetic-tape changer according to one embodiment of the present invention as viewed from the front side.
Figure 3B:
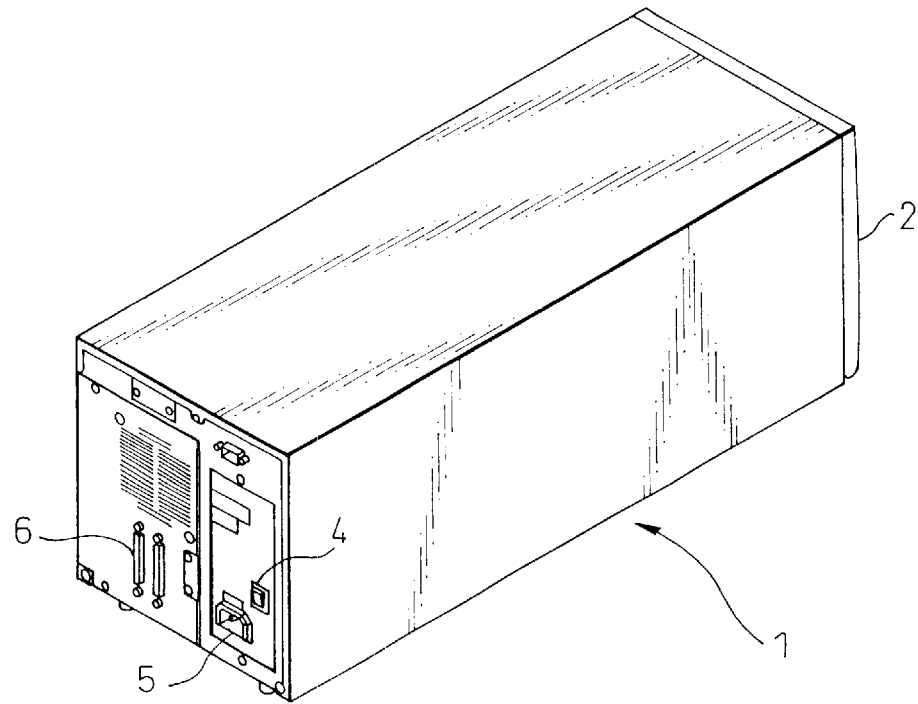
FIG. 3B is a perspective view of the automatic changer shown in FIG. 3A as viewed from the back side.

FIG. 3A is a perspective view of an automatic magnetic-tape changer 1 according to one embodiment of the present invention as viewed from the front side, and FIG. 3B is a perspective view of this automatic changer 1 as viewed from the back side. An open/close window 2 for exchanging recording media that are accommodated inside this automatic magnetic-tape changer 1 is provided at the front-surface side of this automatic changer. An operation panel 3 is provided on this open/close window 2. At the back-surface side of this automatic magnetic-tape changer 1, there are provided a power source switch 4, a power source terminal 5 to which a power source cord is connected, and a data input/output connector 6. A reference number 7 denotes an open/close knob that is provided on the open/close window 2. When this knob 7 is pulled, the open/close window is opened.

Figure 4A:
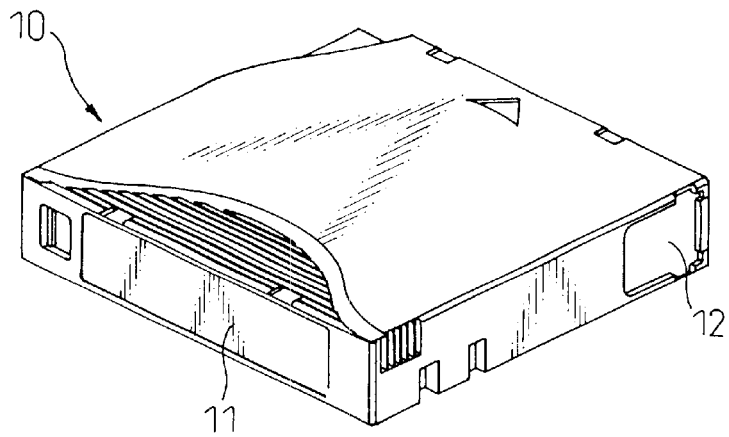
FIG. 4A is a perspective view of a magnetic-tape cartridge that is incorporated in the automatic magnetic-tape changer shown in FIGS. 3A and 3B.
Figure 4B:
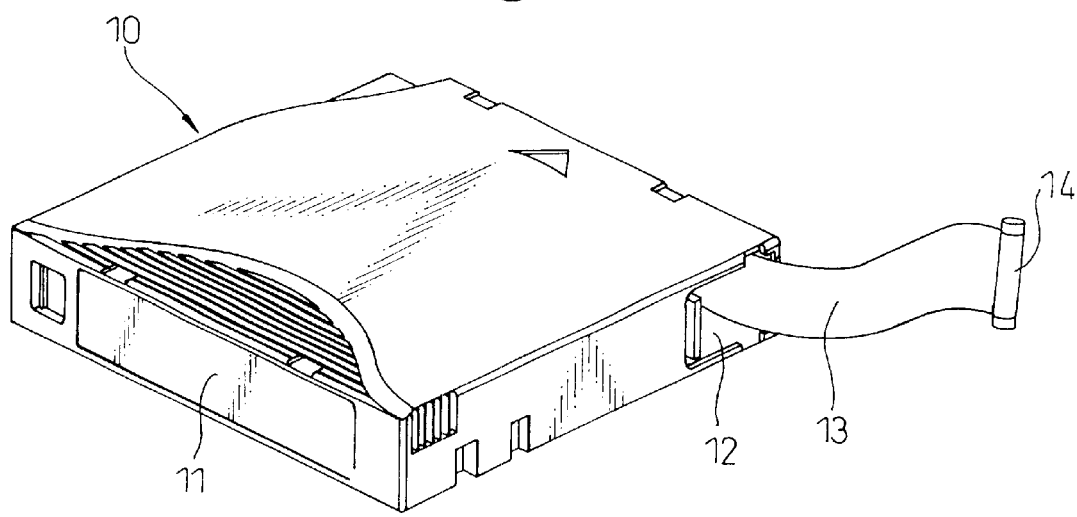
FIG. 4B is a perspective view of a magnetic-tape cartridge that shows a state where a magnetic tape is drawn out from the magnetic-tape cartridge shown in FIG. 4A.
Figure 4C:
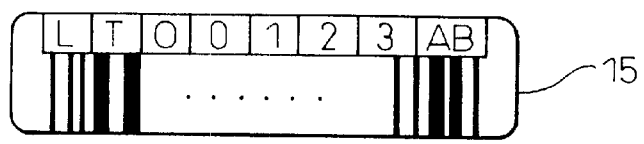
FIG. 4C is a diagram showing one example of a bar code label inscribed with a bar code that is adhered to side surface of the magnetic-tape cartridge shown in FIGS. 4A and 4B.

A magnetic tape cartridge (hereinafter to be simply referred to as a cartridge) 10 as shown in FIG. 4A, for example, is provided as a recording medium, in a large number, in the automatic magnetic-tape changer 1 of this embodiment. An identification label adhesion area 11 and a magnetic-tape drawing opening 12 for a magnetic tape wound around an incorporated reel are provided on the side surface of the cartridge 10. When the cartridge 10 is inserted into a recording/reproducing apparatus (drive) to be described later, a magnetic tape 13 is drawn out and guided, by a leader pin 14, from the drawing opening 12, as shown in FIG. 4B. A bar code label 15 printed with a bar code as an identifier is adhered to the identification label adhesion area 11 of the cartridge, as shown in FIG. 4C. It is possible to recognize a volume number and the contents of the volume of each cartridge 10, by reading the bar code printed on this bar code label 15.

For the label adhered to the identification label adhesion area 11, it is also possible to use a label printed with a two-dimensional bar code, or a label printed with a mark or a symbol, in addition to the bar code label 15 printed with the bar code.

Figure 5A:
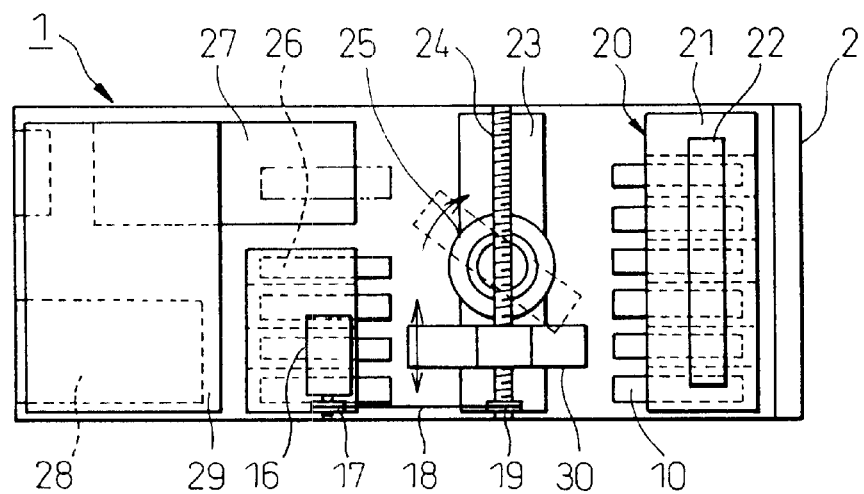
FIG. 5A is a top plan view for explaining an internal structure of the automatic magnetic-tape changer shown in FIGS. 3A and 3B, with a ceiling plate removed from the automatic changer.
Figure 5B:
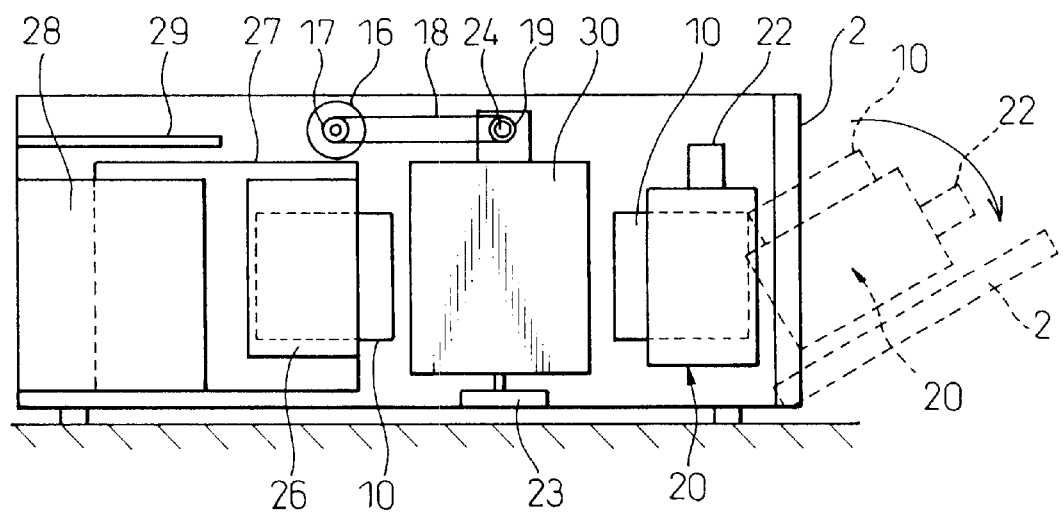
FIG. 5B is a side view of the automatic changer shown in FIG. 5A.

FIG. 5A shows an internal structure of the automatic magnetic-tape changer 1 explained with reference to FIGS. 3A and 3B, and FIG. 5B shows a side view of this automatic changer shown in FIG. 5A. It is possible to open the open/close window 2 forward with the know 7 shown in FIG. 3A, as shown in FIG. 5B. In this example, a magazine 20 having seven cells 21 for accommodating cartridges 10 is fitted to the inside of the open/close window 2. A knob 22 is provided on the upper portion of the magazine 20, and this knob 22 is used to take out the magazine 20 from the open/close window 2. The magazine 20 is fitted to the inside of the open/close window 2 in a state where the magazine 20 usually accommodates the cartridges 10 as recording media in the cells 21.

A fixed holder 26 having four cells that accommodate cartridges 10 is provided inside the automatic magnetic-tape changer 1. Each cell of the fixed holder 26 is open to the open/close window 2 side. A driver 27 as the recording/reproducing apparatus of the cartridges 10 is provided adjacent to the fixed holder 26. Further, a power source 28 is provided at a furthest position from the open/close window 2 inside the automatic magnetic-tape changer 1. A main board 29 installed with a control circuit of the automatic magnetic-tape changer 1 is provided above the power source 28 and the driver 27.

A space is provided between the magazine 20 and the fixed holder 26 in a state where the open/close window 2 is closed. An accessor 30 that can move in a width direction of the automatic magnetic-tape changer 1 is provided in this space. This accessor 30 holds a cartridge 10 that is accommodated in the cell 21 of the magazine or in the fixed holder 26, and conveys this cartridge to the driver 27. The accessor 30 also returns a cartridge 10 that is in the driver 27 to the magazine 20 or the fixed holder 26. The lower portion of this accessor 30 is positioned on a guide rail 23 provided on the floor surface of the automatic magnetic-tape changer 1 in its width direction. The upper portion of the accessor 30 is engaged with a ball screw 24 applied in a width direction of the automatic magnetic-tape changer 1. The accessor 30 moves in the width direction of the automatic magnetic-tape changer 1 based on the rotation of the ball screw 24. A rotation mechanism of the ball screw 24 consists of a motor 16 that is provided in the upper space of the automatic magnetic-tape changer 1, a pulley 17 fitted to the rotation axis of the motor 16, a pulley 19 fitted to one end of the ball screw 24, and a timing belt 18 that is applied between the pulley 17 and the pulley 19.

A rotation mechanism 25 that makes the accessor 30 rotate by 180 degrees is provided at the center of the guide rail 23. The accessor 30 can accommodate a cartridge 10 from only one side surface of the accessor 30 into the main body. Therefore, this rotation mechanism 25 is necessary to enable the accessor 30 to make access to both the magazine 20 and the fixed holder 26.

Figure 6A:
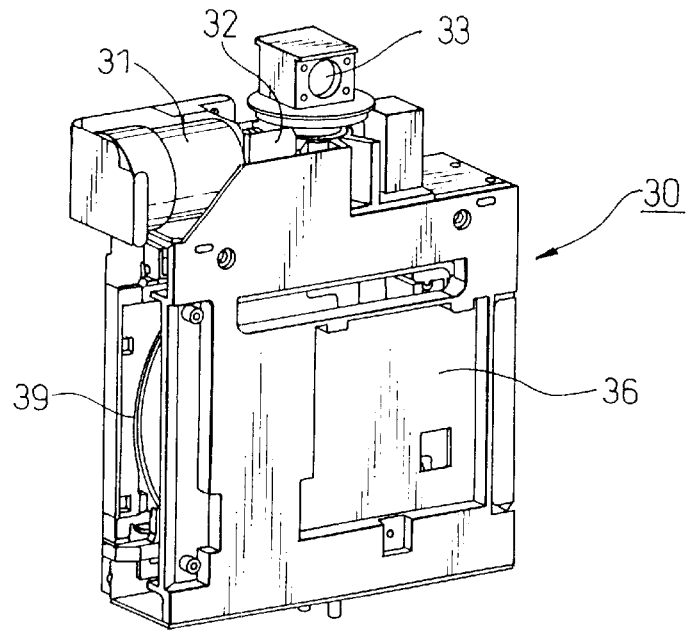
FIG. 6A is a perspective view of one embodiment of an accessor that constitutes the automatic changer of the present invention.

FIG. 6A shows a detailed structure of one embodiment of the accessor 30 explained with reference to FIG. 5. The accessor 30 can accommodate and convey only one cartridge 10 as explained with reference to FIG. 4, and has a hand mechanism section (to be described later) that holds the cartridge 10, inside the accessor 30. The cartridge 10 is inserted into an insertion hole 39 provided on one of longitudinal side surfaces of the accessor 30, and is pulled toward the inside of the accessor 30 with the hand mechanism section. A screw insertion hole 33 for passing through the ball screw 24 is provided on the upper portion of the accessor 30. A moving mechanism 32 of a hand mechanism section 40, to be described later, is provided at a position adjacent to this screw insertion hole 33. This moving mechanism 32 is driven with a motor 31 provided on the upper portion of the accessor 30.

Figure 6B:
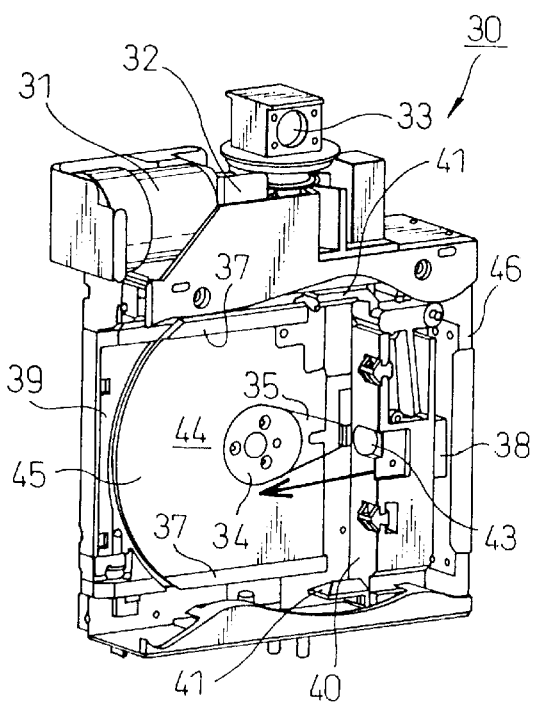
FIG. 6B is a partially-cutaway perspective view of an internal structure of the automatic changer shown in FIG. 6A, with a side wall removed from the automatic changer.

FIG. 6B shows an internal structure of the automatic changer shown in FIG. 6A, with a side wall 36 adjacent to this insertion hole 39 removed from the automatic changer. In an internal space 44 that continues from the insertion hole 39 of the accessor 30, there is provided the hand mechanism section 40 that holds a cartridge 10, pulls the cartridge 10 into the accessor 30, and releases the cartridge 10 from the accessor 30. Two holding arms 41 are provided on the hand mechanism section 40 in projection to the insertion hole 39 side, and a condenser lens 43, to be described later, is provided at the center of the hand mechanism section 40.

The hand mechanism section 40 is structured to be able to move along two guide rails 37 provided on a floor surface 45 of the internal space 44 of the accessor 30. An arm 35 that is driven by the motor 31 and the moving mechanism 32 is provided on this floor surface 45. The hand mechanism section 40 can move on the guide rail 37 based on the move of this arm 35. A fitting base 34 of the arm 35 is rotated by the moving mechanism 32. A CCD 38 is provided in the internal space 44 of a side wall 46 that is at the opposite side of the insertion hole 39 of the hand mechanism section 40. This CCD 38 is provided on the moving axis line of the condenser lens 43 provided in the hand mechanism section 40.

Figure 6C:
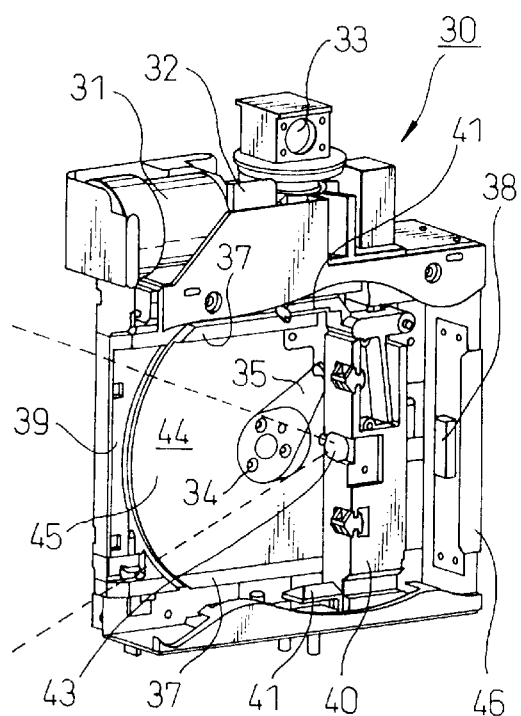
FIG. 6C is a partially-cutaway perspective view of the automatic changer showing a state where a hand mechanism section shown in FIG. 6B has moved to a position of reading a bar code adhered to the magnetic tape cartridge.

FIG. 6C shows a status that the hand mechanism section 40 shown in FIG. 6B has moved to a position of reading a bar code adhered to a magnetic tape cartridge not shown. In this status, the condenser lens 43 focuses the image of the bar code positioned at the front within a readable range shown by broken lines on the CCD 38. Therefore, the CCD 38 can read the bar code.

Figure 7:
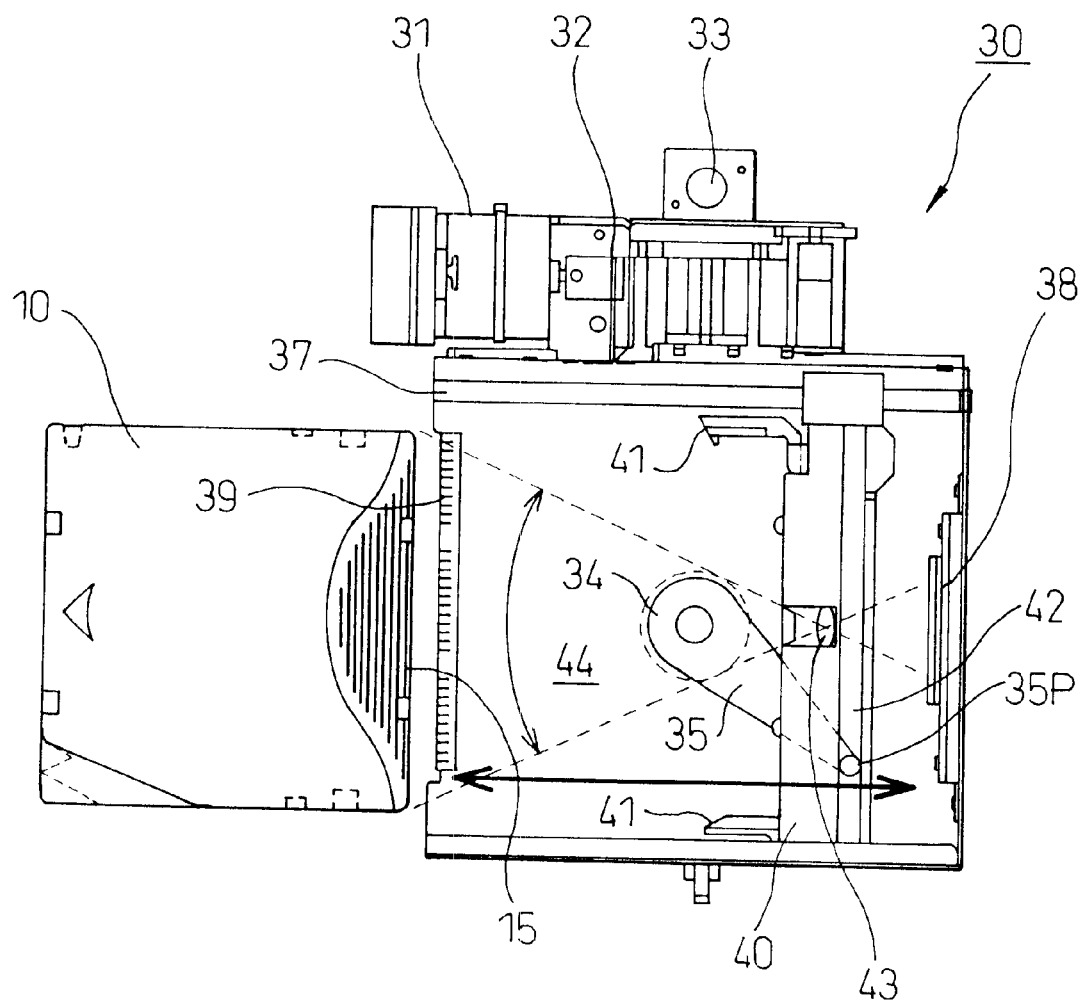
FIG. 7 is a side view of the automatic magnetic-tape changer of the present invention showing a state where an accessor is reading a bar code at a position of reading the bar code adhered to the magnetic tape cartridge.

FIG. 7 shows a state of FIG. 6C together with the cartridge 10. FIG. 7 shows the driving mechanism of the hand mechanism section 40 in detail. A pin sliding groove 42 is provided in the hand mechanism section 40 in its longitudinal direction. A pin 35P provided in projection on the front end of the arm 35 is slidably engaged with this pin sliding groove 42. Therefore, when the arm 35 rotates based on the rotation of the motor 34, the pin 35P at the front end of the arm 35 moves by sliding within this pin sliding groove 42. Consequently, the hand mechanism section 40 moves within the internal space 44 in a direction shown by a thick arrow along the guide rail 37 of the hand mechanism section 40. Then, in a state where the hand mechanism section 40 is stationary at a position shown in the drawing, the condensing lens 43 focuses the image of the bar code label 15 adhered to the side surface of the cartridge 10 on the CCD 38. As a result, the CCD 38 reads the bar code printed on this bar code label 15. The circuit installed on the main board 29, that is explained with reference to FIG. 5, decodes the bar code that has been read by the CCD 38.

Figure 8A:
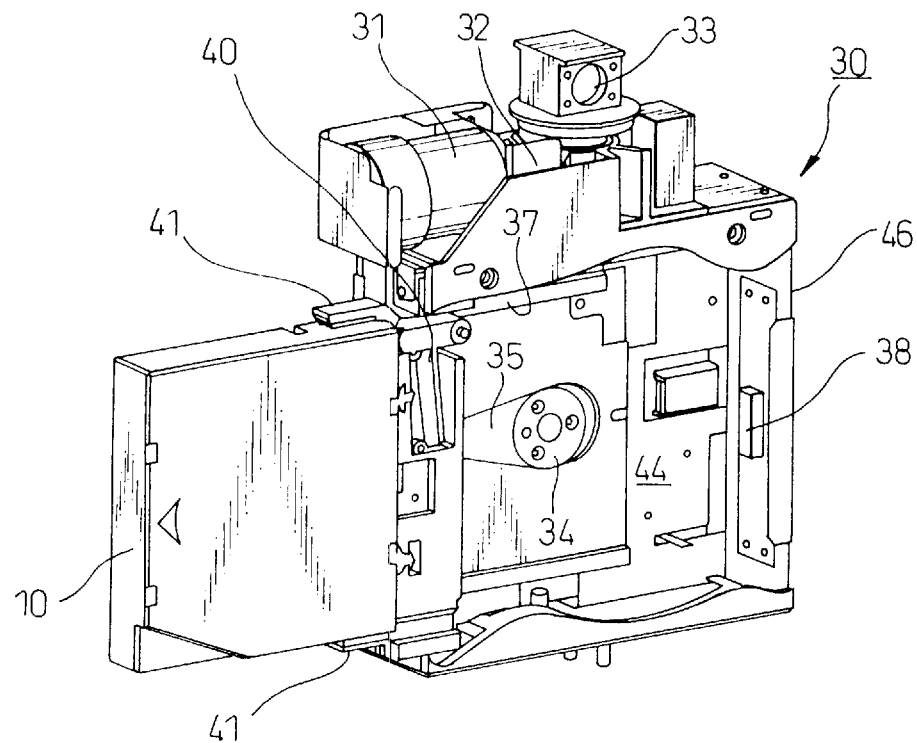
FIG. 8A is a perspective view of the automatic changer shown in FIG. 6 showing a state where the hand mechanism section holds a magnetic-tape cartridge.

FIG. 8A shows a state where the hand mechanism section 40 shown in the state of FIG. 7 has moved to the insertion hole 39 side, and the holding arm 41 holds the cartridge 10. When the arm 35 has rotated to the insertion hole 39 side based on the rotation of the motor 34, the hand mechanism section 40 becomes in a state where it has moved to the nearest position of the insertion hole 39. In this state, the holding arm 41 stretches from the accessor 30, and holds the cartridge 10. When the motor 31 rotates in the state where the hand mechanism section 40 is stationary at a position shown in the drawing, and when the arm 35 rotates to the CCD 38 side, the hand mechanism section 40 moves to the internal space 44 side as shown in FIG. 8B, and the cartridge 10 is accommodated into the accessor 30.

Figure 8B:
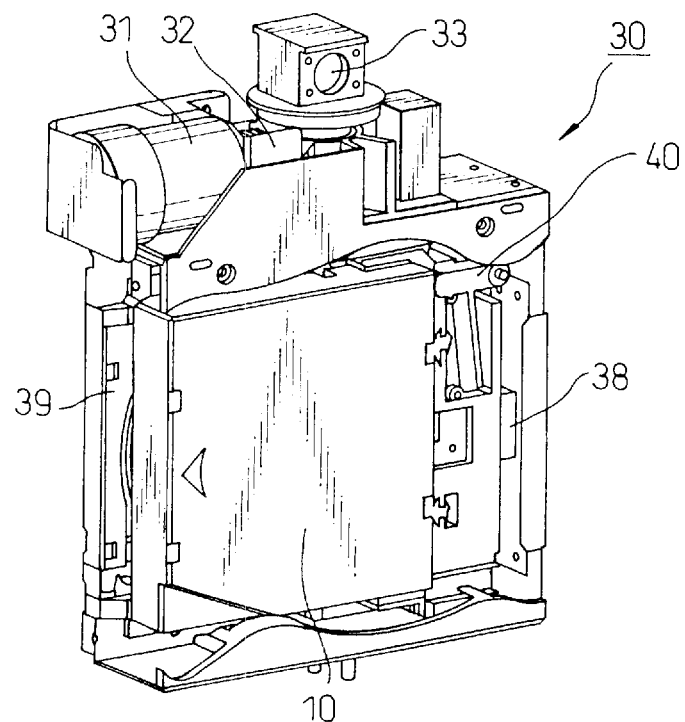
FIG. 8B is a perspective view of the automatic changer showing a state where the magnetic-tape cartridge has been pulled into the automatic changer from the status shown in FIG. 8A.

The state of FIG. 8B is the same as the state shown in FIG. 5A. In the state where the accessor 30 accommodates the cartridge 10, the accessor 30 moves within the automatic changer 1 based on the rotation of the ball screw 24, conveys the accommodated cartridge 10 to the drive 27, and sets the cartridge 10 to the drive 27. Based on the above operation, the accessor 30 of the present invention can read and understand the contents of the bar codes of the cartridges 10 that are accommodated in the cells 21 of the magazine 20 and in the fixed holder 26 provided within the automatic changer 1. Further, the accessor 30 can hold the cartridges 10 that are accommodated in the cells 21 of the magazine 20 or in the fixed holder 26, and convey the cartridges 10 to the driver 27. The accessor 30 can return the cartridges 10 in the drive 27 to the magazine 20 or the fixed holder 26.

As explained above, according to the present invention, the CCD 38 is provided within the cartridge accommodation space 40 of the accessor 40, and the condensing lens that focuses the image of the bar codes on the CCD is incorporated in the hand mechanism section 40. Therefore, there is no portion that projects from the main body toward the outside, unlike the conventional bar-code reader and automatic changer, and it becomes possible to reduce the size of the accessor 30. As a result, a distance over which the accessor 30 can move within the automatic changer 1 increases, and it becomes possible to accommodate more cartridges 10 than usual. While the automatic magnetic-tape changer 1 of the present embodiment can accommodate eleven cartridges 10, the conventional automatic changer of the same sizes can accommodate only seven to eight cartridges 10.

Figure 9A:
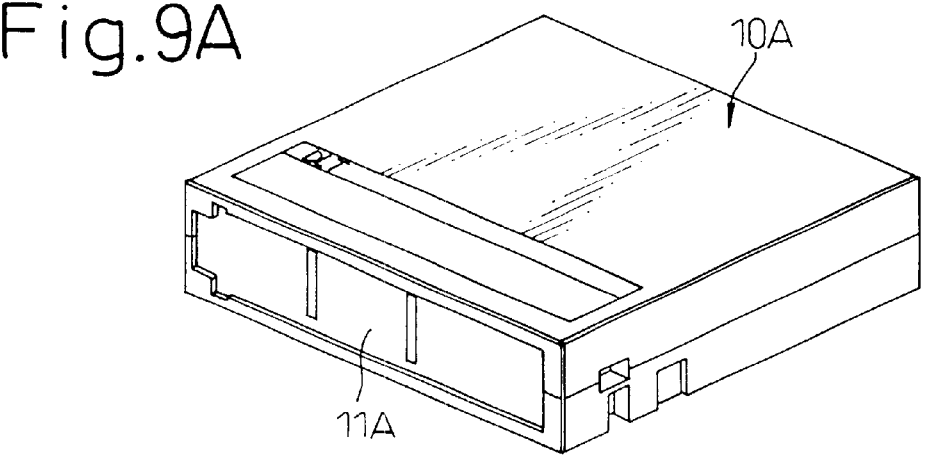
FIG. 9A is a perspective view of another embodiment of a magnetic-tape cartridge that is used in the automatic changing of the present invention.
Figure 9B:
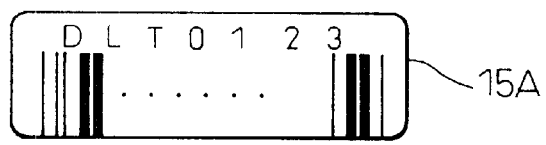
FIG. 9B is a diagram showing one example of a bar code that is adhered to the side surface of the magnetic-tape cartridge shown in FIG. 9A.
Figure 9C:
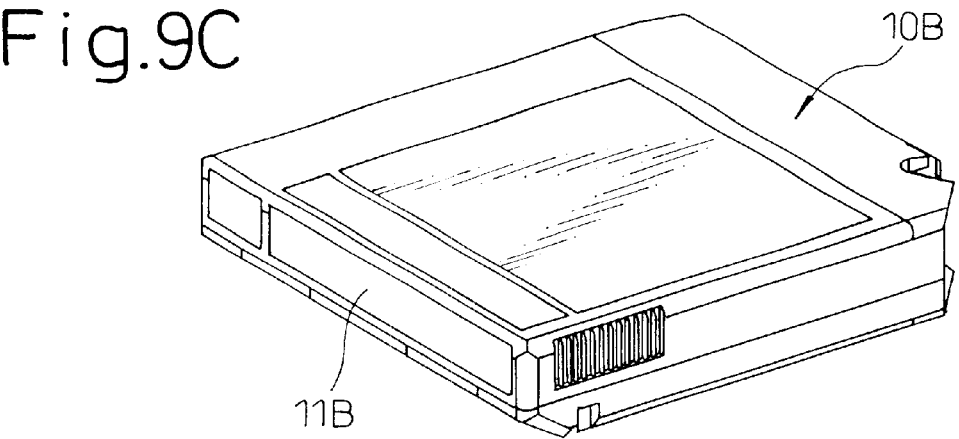
FIG. 9C is a perspective view of still another embodiment of a magnetic-tape cartridge that is used in the automatic changing of the present invention.
Figure 9D:
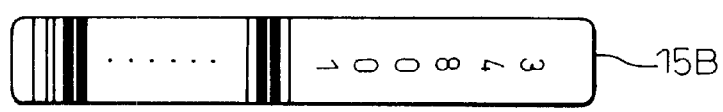
FIG. 9D is a diagram showing one example of a bar code that is adhered to the side surface of the magnetic-tape cartridge shown in FIG. 9C.

FIG. 9A shows another embodiment of a magnetic-tape cartridge 10A that is used in the automatic changing of the present invention. A bar code adhesion area 11A is provided on the side surface of the cartridge 10A. A bar code label 15A described with a bar code as shown in FIG. 9B is adhered to the bar code adhesion area 11A of the cartridge 10A. FIG. 9C shows still another embodiment of a magnetic-tape cartridge 10B that is used in the automatic changing of the present invention. A bar code adhesion area 11B is provided on the side surface of the cartridge 10B. A bar code label 15B described with a bar code as shown in FIG. 9D is adhered to the bar code adhesion area 11B of the cartridge 10B. It is possible to recognize volume numbers and the contents of the volumes of the cartridge 10A and 10B, by reading the bar codes printed on the bar code labels 15A and 15B respectively.

In the above embodiments, magnetic-tape cartridges have been explained as recording media that are incorporated in the automatic changer. However, the recording media are not particularly limited to magnetic tapes, and any recording medium that is accommodated in a cartridge can be used as the recording medium to be incorporated in the automatic changer. For example, as cartridges that can be used in the automatic changer of the present invention, there are MO (magnetic optical) cartridges that use optical disks, cartridges that accommodate DVDs (digital versatile disks) or MDs (mini disks), and stick-shaped cartridges that incorporate non-volatile IC memories.

As explained above, according to the automatic changer of the present invention, the image pick-up member that reads an identifier attached to a cartridge and recognizes this cartridge, and the condenser lens, are provided within the casing and the hand mechanism of the accessor respectively. Therefore, the image pick-up member and the condenser lens do not stretch out from the accessor, and it becomes possible to make the accessor compact. As a result, there is an effect that it is possible to reduce the sizes of the automatic changer and increase the number of cartridges that can be accommodated within the automatic changer, without changing the size of the automatic changer.

What is claimed is:

1. An automatic changer comprising a cartridge accommodating section that accommodates a plurality of cartridges such that the cartridges can be selected, and an accessor that selects one cartridge from the accommodating section, and conveys the selected cartridge to a predetermined position within a casing, the automatic changer being structured to read an identifier of a label adhered to at least one surface of a cartridge, and identifies each cartridge, wherein a hand mechanism that holds a cartridge and pulls the cartridge into an internal space or releases the cartridge from the internal space, is provided within the internal space that accommodates the cartridges; an identifier-image pick-up member is disposed in the inner part of the internal space; a condenser lens is disposed on an optical axis of the image pick-up member in a move direction of the hand mechanism; and the hand mechanism in a state of not holding the cartridge is moved within the internal space thereby to focus the identifier on the image pick-up member.

2. The automatic changer according to claim 1, wherein the image pick-up member is a CCD.

3. The automatic changer according to claim 1 or 2, wherein the cartridge is a magnetic-tape cartridge.

4. The automatic changer according to claim 1 or 2, wherein the cartridge is a cartridge that accommodates an optical magnetic disk.

5. The automatic changer according to claim 1 or 2, wherein the cartridge is a cartridge that accommodates a non-volatile IC memory.

6. The automatic changer according to claim 1, wherein the identifier is a bar code.

7. The automatic changer according to claim 1, wherein the accessor is structured to be able to move along a guide rail provided on a floor surface of the casing in a width direction; cartridge accommodating sections are provided at both sides of the accessor along a moving direction of the accessor; and a rotation mechanism is provided that can convey a cartridge to any one of the cartridge accommodating sections based on a rotation of the accessor in a horizontal direction.

8. The automatic changer according to claim 7, wherein a ball screw applied in a width direction of the casing is engaged with the other end of the guide rail of the accessor, and the accessor moves based on a rotation of the ball screw.

9. The automatic changer according to claim 7, wherein a driver as a recording/reproducing apparatus to which the accessor conveys a cartridge is provided at one side of the accessor in a moving direction thereof.

10. The automatic changer according to claim 9, wherein the cartridge accommodating section at one side at which the driver is provided is fixed, and the other cartridge accommodating section at the other side is formed as a magazine that can be exchanged.

11. The automatic changer according to claim 10, wherein the magazine that can be exchanged is detachably fitted to an open/close window of the automatic changer.

* * * * *

UNITED STATES PATENT AND TRADEMARK OFFICE
CERTIFICATE OF CORRECTION

PATENT NO. : 6,717,766 B2
DATED : April 6, 2004
INVENTOR(S) : Koujirou Hashimoto et al.

It is certified that error appears in the above-identified patent and that said Letters Patent is hereby corrected as shown below:

Title page,
Item [73], Assignee, should be -- Fujitsu Limited --.

Signed and Sealed this

Sixth Day of September, 2005

JON W. DUDAS
*Director of the United States Patent and Trademark Office*